US010599617B2

(12) United States Patent
Oganezov et al.

(10) Patent No.: US 10,599,617 B2
(45) Date of Patent: Mar. 24, 2020

(54) METHODS AND APPARATUS TO MODIFY A BINARY FILE FOR SCALABLE DEPENDENCY LOADING ON DISTRIBUTED COMPUTING SYSTEMS

(71) Applicant: Intel Corporation, Santa Clara, CA (US)

(72) Inventors: Alexander A. Oganezov, Portland, OR (US); Jeffrey V. Olivier, Longmont, CO (US); Aditi Gaur, Longmont, CO (US)

(73) Assignee: INTEL CORPORATION, Santa Clara, CA (US)

( * ) Notice: Subject to any disclaimer, the term of this patent is extended or adjusted under 35 U.S.C. 154(b) by 223 days.

(21) Appl. No.: 15/637,372

(22) Filed: Jun. 29, 2017

(65) Prior Publication Data

US 2019/0005058 A1    Jan. 3, 2019

(51) Int. Cl.
*G06F 16/16* (2019.01)
*G06F 16/172* (2019.01)
(Continued)

(52) U.S. Cl.
CPC .......... *G06F 16/166* (2019.01); *G06F 16/172* (2019.01); *G06F 16/182* (2019.01); *H04L 67/2842* (2013.01); *H04L 67/10* (2013.01)

(58) Field of Classification Search
CPC .... G06F 16/166; G06F 16/182; G06F 16/172; H04L 67/2842; H04L 67/10
(Continued)

(56) References Cited

U.S. PATENT DOCUMENTS 8,756,695 B1 * 6/2014 Golomb ............... G06F 21/563
370/328
2011/0173607 A1 * 7/2011 Murphey .................. G06F 8/71
718/1
(Continued)

OTHER PUBLICATIONS

Coral NRE, "Coral NRE Documents," Sep. 28, 2017, retrieved from Internet on Oct. 4, 2017, [https://wiki.hpdd.intel.com/display/PUB/CORAL+NRE+Documents], 1 page.
(Continued)

*Primary Examiner* — Syed H Hasan
*Assistant Examiner* — Nicholas E Allen
(74) *Attorney, Agent, or Firm* — Hanley, Flight & Zimmerman, LLC

(57) ABSTRACT

Methods and apparatus to modify a binary file for scalable loading on distributed computing systems are disclosed. An example method to modify a binary file for scalable loading on a distributed computing system includes identifying, by executing an instruction with a processor, in the binary file a file name for a shared file, determining, by executing an instruction with the processor, whether the shared file can be loaded based on a path name specified in the binary file, and, responsive to a determination that the shared file can be loaded, generating, by executing an instruction with the processor, an identifier that can be used to access a local file scalably copied from a global file system, and modifying, by executing an instruction with the processor, the binary file by replacing, in the binary file, the file name with the generated identifier.

21 Claims, 8 Drawing Sheets

(51) Int. Cl.
*G06F 16/182* (2019.01)
*H04L 29/08* (2006.01)

(58) Field of Classification Search
USPC .......................................... 707/827
See application file for complete search history.

(56) References Cited

U.S. PATENT DOCUMENTS

| | | | | |
|---|---|---|---|---|
| 2012/0131309 | A1* | 5/2012 | Johnson | G06F 9/30 |
| | | | | 712/41 |
| 2012/0246131 | A1* | 9/2012 | Semerdzhiev | G06F 16/10 |
| | | | | 707/695 |
| 2013/0276056 | A1* | 10/2013 | Epstein | G06F 21/604 |
| | | | | 726/1 |
| 2014/0372607 | A1* | 12/2014 | Gladwin | H04L 67/16 |
| | | | | 709/224 |
| 2015/0222637 | A1* | 8/2015 | Hung | G06F 21/53 |
| | | | | 726/1 |
| 2016/0259712 | A1* | 9/2016 | Fazunenko | G06F 11/3676 |
| 2017/0078311 | A1* | 3/2017 | Clark | H04L 63/1416 |

OTHER PUBLICATIONS

Lawrence Livermore National Laboratory, "Spindle: Scalable Shared Library Loading," retrieved from Internet on Oct. 4, 2017, [https://computation.llnl.gov/projects/spindle], 3 pages.

* cited by examiner

```
For each dependency in ELF header
    {
    link_name = NULL
    newname = modify_extension(dependency)
    For each path in RPATH entry
        {
606 ——  link_name = lookup_link_table(<path>/<dependency>)
608 ——  If link_name != NULL
                break
612 ——  Attempt scalable load of <path>/<dependency>
        If load failed
                continue
        link_name = newname
614     While (lookup_cached_table(link_name) != NULL)
                link_name = mangle(link_name)
        insert_cached_table(link_name, /tmp/FUSE/<path>/<dependency>)
616     insert_link_table(<path>/dependency>, link_name)
        break
        }
610 if link_name != NULL
        replace dependency with link_name in ELF header
    }
618 ——Remove RPATH from ELF header
```

Braces: 602 encloses the whole block; 604 encloses the "For each dependency" body; 606–616 as labeled within the inner "For each path in RPATH entry" loop.

FIG. 6

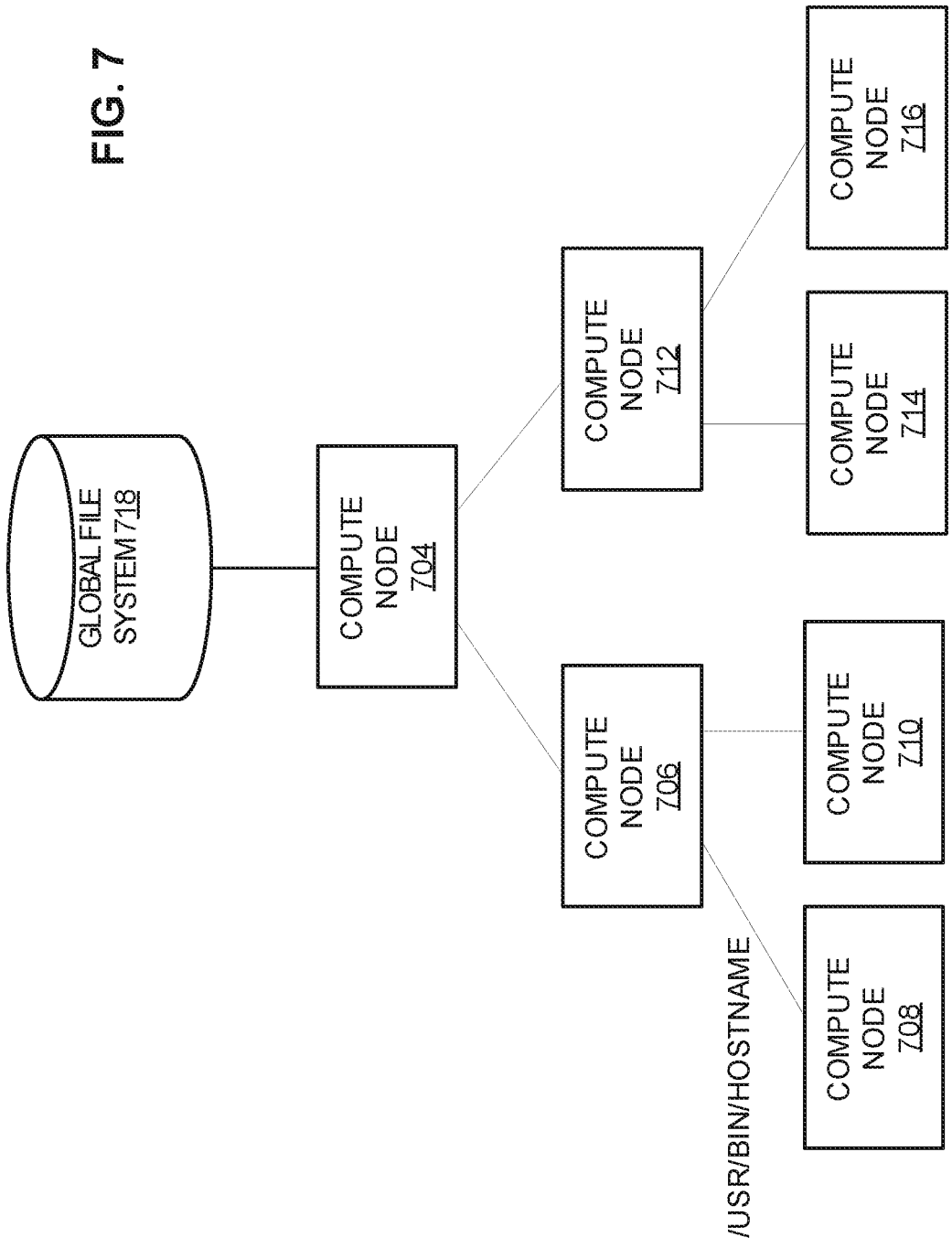

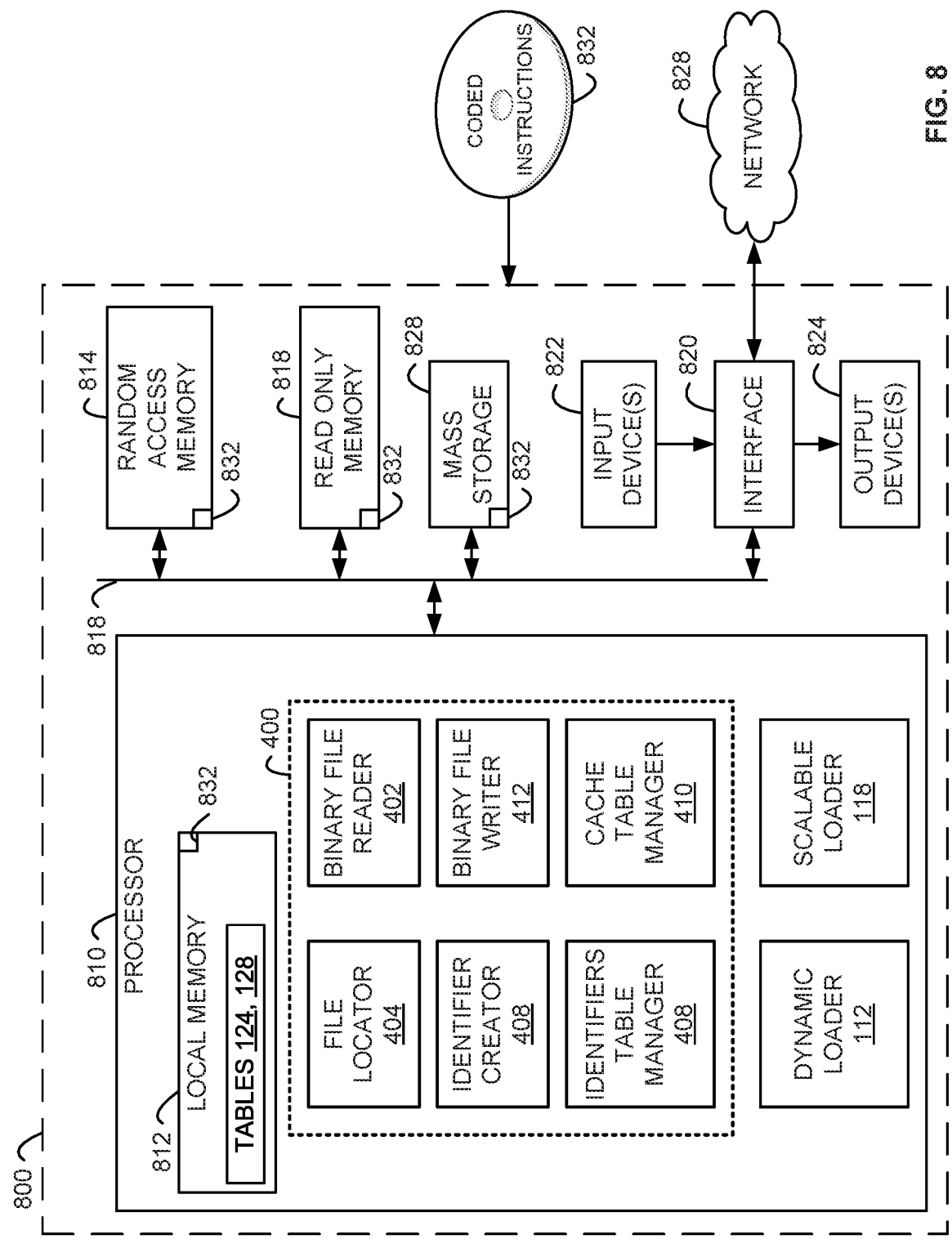

US 10,599,617 B2

METHODS AND APPARATUS TO MODIFY A BINARY FILE FOR SCALABLE DEPENDENCY LOADING ON DISTRIBUTED COMPUTING SYSTEMS

GOVERNMENT LICENSE RIGHTS

This invention was made with Government support under contract number B609815 awarded by the Department of Energy. The Government has certain rights in this invention.

FIELD OF THE DISCLOSURE

This disclosure relates generally to distributed computing systems, and, more particularly, to methods and apparatus to modify a binary file for scalable dependency loading on distributed computing systems.

BACKGROUND

Distributed computing systems are computing systems having a plurality of compute nodes that compute in parallel (e.g., often the same program(s)) to collectively implement a computing system having a larger computing capability than the individual compute nodes. A known example binary file (e.g., an Executable Linkable Format (ELF) file) includes a list of dependencies (e.g., shared object, library files) on which the binary file depends. To enable a dynamic loader, at run time, to locate the dependencies, the binary file includes or specifies a run-time search path, or RPATH. An example RPATH includes an ordered list of paths that may contain none, or one or more of the dependencies. For each dependency, the dynamic loader successively tries the paths in the RPATH until the dependency is successfully loaded or not found, at which point it will attempt to load those dependencies from system defined library search paths, if found.

BRIEF DESCRIPTION OF THE DRAWINGS

FIG. 6 is a listing of example pseudo-code that may be implemented as machine readable instructions and executed to implement the example binary modifier of FIG. 1 and/or FIG. 4 to modify a binary file for scalable dependency loading.

FIG. 7 is a block diagram of an example scalable dependency loading of a computing system.

FIG. 8 illustrates an example processor platform structured to execute the example machine readable instructions of FIGS. 5A and 5B, and FIG. 6 to implement the example binary modifier of FIG. 1 and/or FIG. 4.

Figure 1:
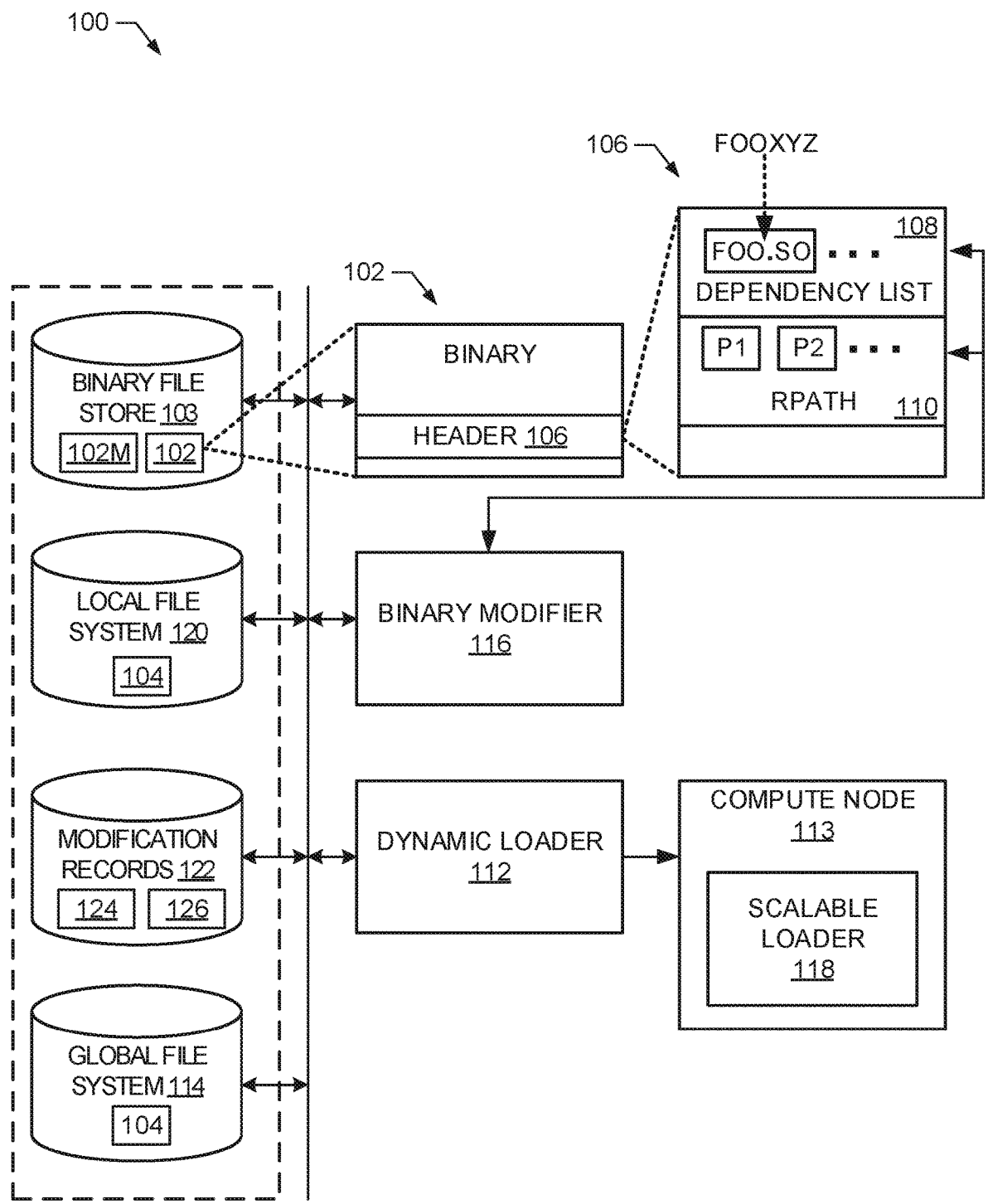
FIG. 1 illustrates an example scalable load system that modifies a binary file for scalable dependency loading on distributed computing systems, according to this disclosure.

Wherever possible, the same reference numbers will be used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

Large distributed computing systems are capable of exaFLOPS, that is, a billion billion operations per second. Bottlenecks can arise in such systems during the load of any binary and its dependencies. The problem can arise when dependencies are retrieved using a hardcoded list of path names (e.g., an RPATH section) built into a binary file (e.g., an ELF file). Whenever the RPATH is present, distributed load logic may be bypassed, and vast numbers of compute nodes will load their dependencies from the same global file system at roughly the same time, creating a bottleneck serving those files. Such scenarios are non-scalable, as the bottlenecks make the addition of more compute nodes impractical, if not impossible. Such systems may take inordinate amounts of time to load applications, thus, becoming unacceptable to users.

Some known solutions rely on users manually changing their compilation procedures to eliminate hardcoded RPATH information from binaries and libraries that are loaded onto a distributed computing system. Such solutions may be perceived negatively by users, due to the requirement to perform additional manual steps before using their applications on the large distributed computing system.

Scalability bottlenecks in distributed computing systems can be reduced by utilizing the aggregate bandwidth of all the compute nodes for loading files. In other known solutions, a dynamic loader is intercepted during its operation to discover library dependences and point the dynamic loader to local copies of files normally retrieved from a global file system. By intercepting the loads of the files and redirecting the load operations, direct retrieval of the files from the global file system can be reduced. Thus, instead of the dynamic loader requesting a file from the global file system, the dynamic loader is redirected to request the file from a designated parent, according to a virtual spanning tree, and the loading of the system becomes scalable. By retrieving files according to a spanning tree (see FIG. 7), and caching the files at each node 704, 706, 708, 710, 712, 714 and 716, the bottleneck at the global file system 718 can be alleviated, and the application becomes scalably loadable. In some examples, a file is scalably loadable when copies of the file can be loaded from local file system of the nodes 704, 706, 708, 710, 712, 714 and 716, rather than all of the nodes 704, 706, 708, 710, 712, 714 and 716 loading the file from the global file system 718. For example, the compute node 708 can request the file "/usr/bin/hostname," and obtain it from its parent compute node 706, rather than from the global file system 718. The compute node 706 can, in turn, obtain the file from the compute node 704, and cache the file locally for subsequent retrieval. The spanning tree can be different for different files, so no single node becomes a bottleneck. However, it is necessary to interrupt the dynamic loader in such solutions, which may not be possible on all distributed computing systems.

To overcome at least these deficiencies of known solutions, example methods and apparatus to modify a binary file for scalable dependency loading on distributed computing systems are disclosed herein. In examples disclosed herein, users are not required to manually modify their files (e.g., they can execute without user involvement, input, etc.) and, because binary files are modified before the dynamic loader is initiated, it is not necessary to interrupt dynamic loader operation. Disclosed examples overcome the problems arising from binary files specifying dependencies (e.g., a list of files on which the binary file depends), and a hardcoded list of paths (e.g., directories) in, for example, an RPATH embedded in the binary file. In some examples, a list of dependencies is a list of file names for the files on which the binary file depends.

In some examples, a list of dependencies is automatically retrieved from a binary file (e.g., an ELF file). The binary file is automatically modified to replace each filename contained (e.g., referenced, etc.) in the list of dependencies with a different (e.g., unique, peculiar, specific, etc.) identifier that references a cached copy of the referenced file in a local file system (e.g., in a File system in Userspace (FUSE)-based local file system). The RPATH is automatically removed (e.g., overwritten, cleared, erased, etc.) from the binary file. In some examples, the binary file is modified seamlessly, and without the manual involvement or input of the user, beyond starting the modification process. In some examples, binary file conversions are performed automatically by compute nodes, with the user being aware of and, in some instances, not caring that the binary file conversions occur. By modifying binary files, as disclosed herein, dependencies previously loaded using the RPATH can now be loaded scalably using a conventional dynamic loader, without having to intercept dynamic loader operations.

Reference will now be made in detail to non-limiting examples of this disclosure, examples of which are illustrated in the accompanying drawings. The examples are described below by referring to the drawings.

FIG. 1 is a block diagram of an example scalable load system 100 to modify an example binary file 102 stored in a binary file store 103 for scalable loading of a shared file 104, according to this disclosure. The example binary file 102 includes one or more executable programs in the form of executable code stored using binary values. In some examples, the binary file 102 is structured or formatted according to an ELF. The binary file 102 includes, among other things, an example header 106. Example headers 106 include, among other things, an example list of dependencies 108 and an example RPATH 110. The example list of dependencies 108 includes a list of file names for files, libraries, binaries, etc., one of which is designated FOO.SO, on which one or more aspects of the binary file 102 depend. When an example dynamic loader 112 loads the binary file 102 on to a compute node 113 of a distributed computing system, the dynamic loader 112 locates the files named in the list of dependencies 108 and, if/when found, loads the files. The example RPATH 110 includes an ordered list of paths P1, P2, . . . (e.g., folders at particular locations, on particular drives, on particular servers, etc.) which the dynamic loader 112 uses to find the files named in the list of dependencies 108. The dynamic loader 112 uses the paths of the RPATH 110 in their order of listing in the RPATH 110, and stops looking for a file once found.

In the example of FIG. 1, the example dependency file FOO.SO at the example path P1 corresponds to the example shared file 104 stored in a global file system 114. In known distributed computing systems, each compute node loading the binary file 102 attempts to access the dependency FOO.SO (corresponding to the shared file 104) from the global file system 114, creating a bottleneck.

To mitigate such bottlenecks, the example scalable load system 100 of FIG. 1 includes an example binary modifier 116. Before the example dynamic loader 112 is initiated to load the binary file 102, the example binary modifier 116 of FIG. 1 modifies the binary file 102 for scalable loading of the shared file 104. The example binary modifier 116 processes the list of dependencies 108 in the binary file 102 using the RPATH 110 in the binary file 102 to identify locations from where files named in the list of dependencies 108 can be loaded. In some examples, the binary modifier 116 calls an example scalable loader 118 implemented on each compute node to determine whether a file specified by a file name and path combination can be loaded. In some examples, the scalable loader 118 is a known or conventional scalable loader used by known distributed computing systems. The call to the scalable loader 118 also includes a local file name and path in a local file system 120 for the file named in the list of dependencies 108. If the file can be loaded, the file is cached locally in the local file system 120 with specified file name and at the specified path. In some examples, the locally cached files are stored in a (sub-)directory of an exported FUSE file system mount point, and the local path for a file includes the path on the global file system 114 prepended with the path of the (sub-)directory of the FUSE mount point. While the file named in the list of dependencies 108 was found to use the RPATH and could be loaded from that location, the file is moved to the local file system 120 to allow the file to be locally provided to other compute nodes, making retrieval of the file across a distributed computing system scalable.

The example binary modifier 116 of FIG. 1 modifies the binary file 102 (or a copy thereof) to overwrite (e.g., change, modify, replace, etc.) the name (e.g., FOO.SO) of each scalably loadable file in the list of dependencies 108 (e.g., the shared file 104) with a different identifier (e.g., FOOXYZ), creating a modified binary file 102M. The identifier is associated with a combination of a path and file name for the file in the local file system 120. Accordingly, the identifier FOOXYZ can be used to, or resolves to the file in the local file system 120. The example binary modifier 116 additionally removes the RPATH 110, as the list of dependencies 108 has been replaced with a list of identifiers for files in the local file system 120, and the original file locations in the global file system 114 are no longer applicable.

Example identifiers (e.g., FOOXYZ) are selected or generated by the example binary modifier 116 (a) to be unique to the original location of the file in the global file system 114, (b) to not be mistaken for a library, including other libraries, in the library path, and (c) to have no more characters than the name of the file in the global file system 114 to ensure the identifiers fit in the modified binary file 102M.

Figure 2:
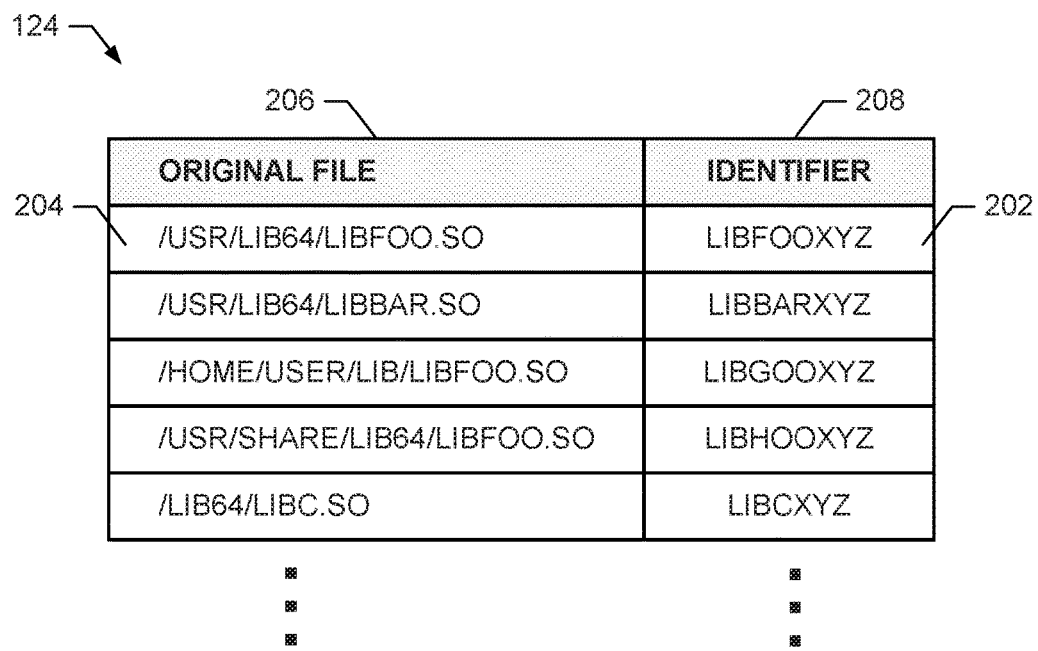
FIG. 2 is an example cache translation table that may be implemented to record binary file modifications.

The example binary modifier 116 stores records of the binary modifications in a modification records data store 122. In some examples, the record of binary modifications is stored using two tables, an example identifiers table 124, and an example cache translation table 126. An example identifiers table 124 shown in FIG. 2 records, in each row, the identifier 202 assigned to a file 204 on the global file system 114. The binary modifier 116 uses the identifiers table 124 to determine whether an identifier has already been assigned to a file by, for example, searching for the file in the first column 206 of the identifiers table 124. The binary modifier 116 also uses the identifiers table 124 to ensure an identifier has not already been used by, for example, searching the second column 208 of the identifiers table 124. An example cache translation table 126 shown in FIG. 3 records, in each row, the locally cached file 302 in the local file system 120 assigned to an identifier 202. While an identifiers table 124 and a cache translation table 126 are shown in FIG. 1, they may be combined into, for example, one table.

Returning to FIG. 1, in operation, when the dynamic loader 112 loads the modified binary file 102M, the dynamic loader 112 obtains the unique identifiers in the list of modified dependencies. The dynamic loader 112 does not need not know that the list of dependencies is a list of identifiers rather than a list of file names. The local file system 120 contains symbolic links that have been created using the cache translation table 126 to identify the locally cached file 302 for each requested identifier 202 provided by the dynamic loader 112, and provides the identified locally cached file.

The example binary file store 103, the example global file system 114, the example local file system 120, and the example modifications records data store 122 may be implemented using any number and/or type(s) of data structure(s), and stored on any number and/or type(s) of volatile and/or non-volatile computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). One or more of the example binary file store 103, the example global file system 114, the example local file system 120 and the example modifications records data store 122 may be combined in any way.

Figure 4:
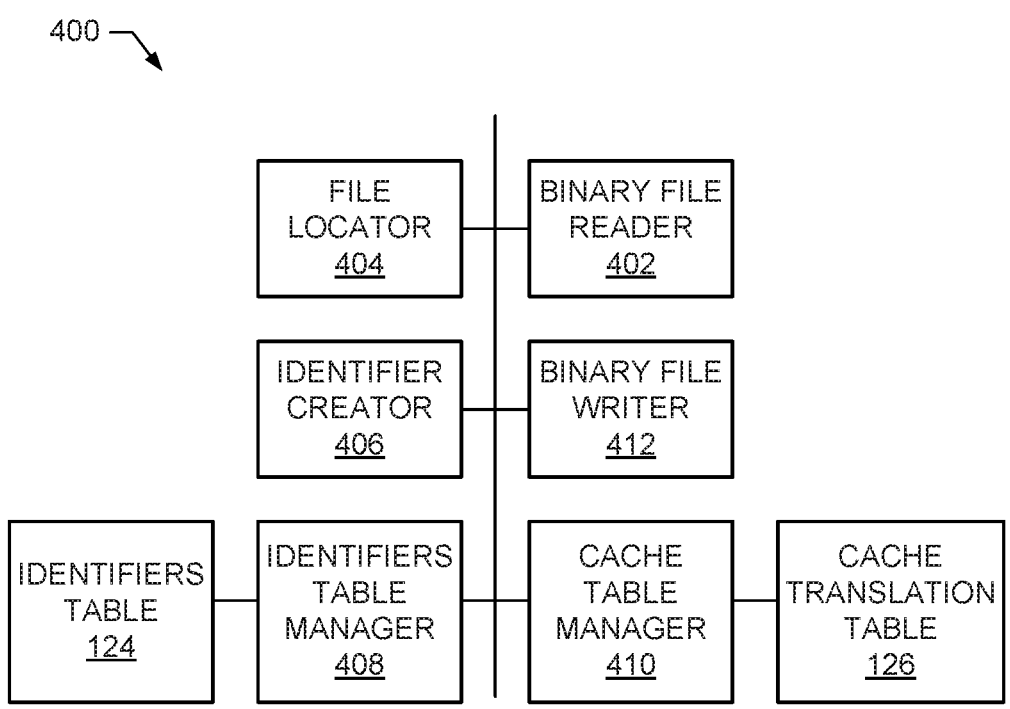
FIG. 4 is a block diagram of an example binary modifier that may be used to implement the example binary modifier of FIG. 1.

FIG. 4 is a block diagram of an example binary modifier 400 that may be used to implement the example binary modifier 116 of FIG. 1. To read binary files, such as the example binary file 102, the example binary modifier 400 of FIG. 4 includes an example binary file reader 402. The example binary file reader 402 opens a binary file to be modified for scalable dependency loading, and parses the opened binary file to obtain a list of dependencies (e.g., file names) and an RPATH.

To render each file named in the list of dependencies scalably loadable, the example binary modifier 400 of FIG. 4 includes an example file locator 404. For each file name identified by the binary file reader 402, the example file locator 404 of FIG. 4 uses paths of the RPATH until a path is found from which the file can be loaded or the list of paths is exhausted. In some examples, loading is attempted using a known scalable loader available to compute nodes of a distributed computing system. If the dependency can be loaded, the file is cached locally in the local file system 120 (FIG. 1) at the specified file name and path.

To create identifiers for locally cached files, the example binary modifier 400 of FIG. 4 includes an example identifier creator 406. The example identifier creator 406 creates identifiers, using any number and/or type(s) of methods, processes, rules, etc., (a) to be particular to the original location of the file in the global file system 114 (FIG. 1), (b) to not be mistaken for a library, including other libraries, in the library path, and (c) to have no more characters than the name of the file in the global file system 114, to ensure the identifier fits in the modified binary file 102M (FIG. 1). Using, for example, an example identifiers table manager 408, the identifier creator 406 queries the identifiers table 124 (FIGS. 1 and 2) to determine whether an identifier has already been assigned to the file in the global file system 114 by, for example, searching for the file in the first column 406 of the identifiers table 124.

If the locally cached file is not listed in the identifiers table 124, the identifier creator 406 generates an identifier (e.g., FOOXYZ of FIG. 1) for the locally cached file. The identifier creator 406 uses, for example, the example identifiers table manager 408, to query the identifiers table 124 to determine whether the identifier has already been assigned to a file in the global file system 114 by, for example, searching for the identifier in the second column 208 of the identifiers table 124. If the identifier is not different from other identifiers, the identifier creator 406 modifies the identifier until unique. Once a unique identifier is generated, identifier creator 406, using the identifiers table manager 408, stores the identifier and file combination in the identifiers table 124.

Figure 3:
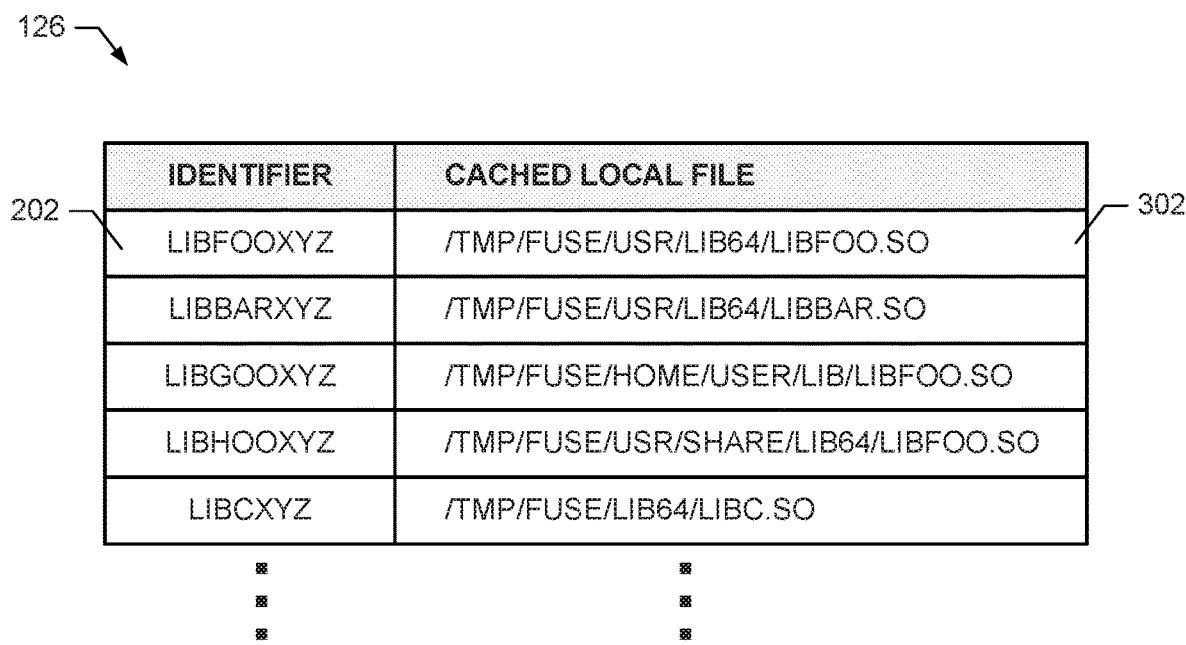
FIG. 3 is an example cache translation table that may be used implement to locate locally cached files.

Using, for example, an example cache table manager 410 of the binary modifier 400, the example file locator 404 stores the generated identifier and a combination of the name and path of the locally cached file in the local file system 120 (FIG. 1) in the cache translation table 126 (FIGS. 1 and 3).

To modify binary files, the example binary modifier 400 of FIG. 4 includes a binary file writer 412. For each file name in the list of dependencies, the example binary file writer 412 replaces in the binary file the file name with its associated identifier generated by the example identifier creator 406. The example binary file writer 412 also overwrites, clears, deletes, removes, etc. the RPATH from the binary file.

The example identifiers table manager 408 and the example cache table manager 410 may be implemented using any number and/or type(s) of processes, rules, methods, application programming interfaces, etc. that allow their respective table(s) to be accessed, queried, searched, modified, updated, augmented, etc.

While an example manner of implementing the example binary modifier 116 of FIG. 1 is illustrated in FIG. 4, one or more of the elements, processes and/or devices illustrated in FIG. 4 may be combined, divided, re-arranged, omitted, eliminated and/or implemented in any other way. Further, the example binary file reader 402, the example file locator 404, the example identifier creator 406, the example identifiers table manager 408, the example cache table manager 410, the example binary file writer 412 and/or, more generally, the example binary modifier 400 of FIG. 4 may be implemented by hardware, software, firmware and/or any combination of hardware, software and/or firmware. Thus, for example, any of the example binary file reader 402, the example file locator 404, the example identifier creator 406, the example identifiers table manager 408, the example cache table manager 410, the example binary file writer 412 and/or, more generally, the example binary modifier 400 of FIG. 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate array(s) (FPGA(s)), and/or field programmable logic device(s) (FPLD(s)). When reading any of the apparatus or system claims of this patent to cover a purely software and/or firmware implementation, at least one of the example binary file reader 402, the example file locator 404, the example identifier creator 406, the example identifiers table manager 408, the example cache table manager 410, the example binary file writer 412, and/or the example binary modifier 400 of FIG. 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example binary modifier 116 of FIG. 4 may include one or more elements, processes and/or devices in addition to, or instead of, those illustrated in FIG. 4, and/or may include more than one of any or all the illustrated elements, processes and devices.

In the illustrated example of FIG. 4, the binary modifier 400 includes means 402 for loading and parsing a binary file. In this example, the loading and parsing means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 4, the binary modifier 400 includes means 404 for identifying a file name for a shared file. In this example, the identifying means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 4, the binary modifier 400 includes means 406 for creating an identifier. In this example, the creating means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 4, the binary modifier 400 includes means 408 and 410 for managing tables. In this example, the managing means are implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 4, the binary modifier 400 includes means 412 for modifying a binary file. In this example, the modifying means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

The illustrated examples of FIGS. 1 and 4 includes means for storing the identifiers table 124 and the cache translation table 126. In this example, the storing means is implemented by any non-transitory computer and/or machine readable storage medium and/or device, but other structures are likewise appropriate.

In the illustrated example of FIG. 1, the system 100 includes means 118 for determining whether a shared file can be loaded. In this example, the determining means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 1, the system 100 includes means 112 for dynamic loading of a file. In this example, the dynamic loading means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

Figure 5A:
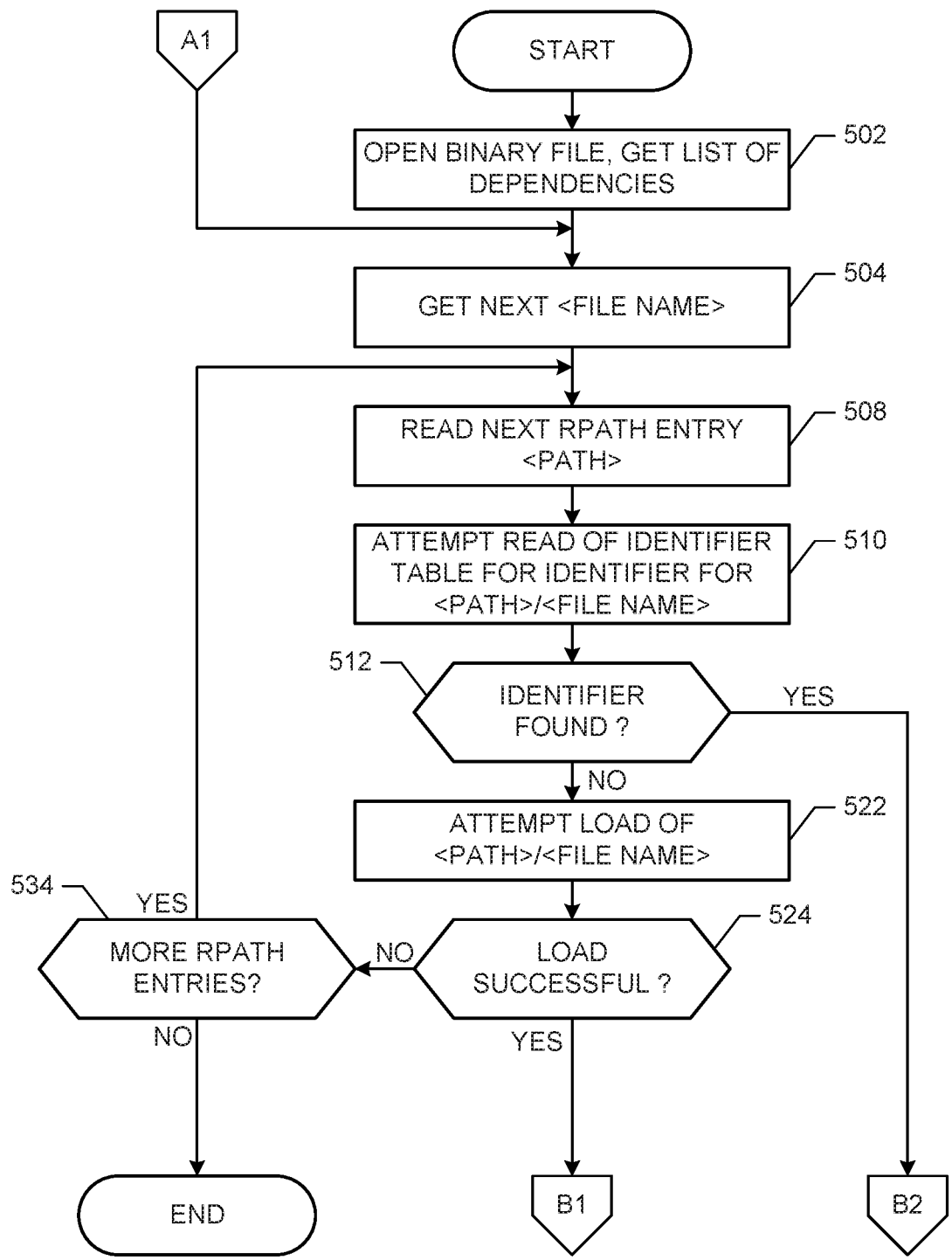
FIGS. 5A and 5B are a flowchart representing example processes that may be implemented as machine readable instructions and executed to implement the example binary modifier of FIG. 1 and/or FIG. 4 to modify a binary file for scalable dependency loading.
Figure 5B:
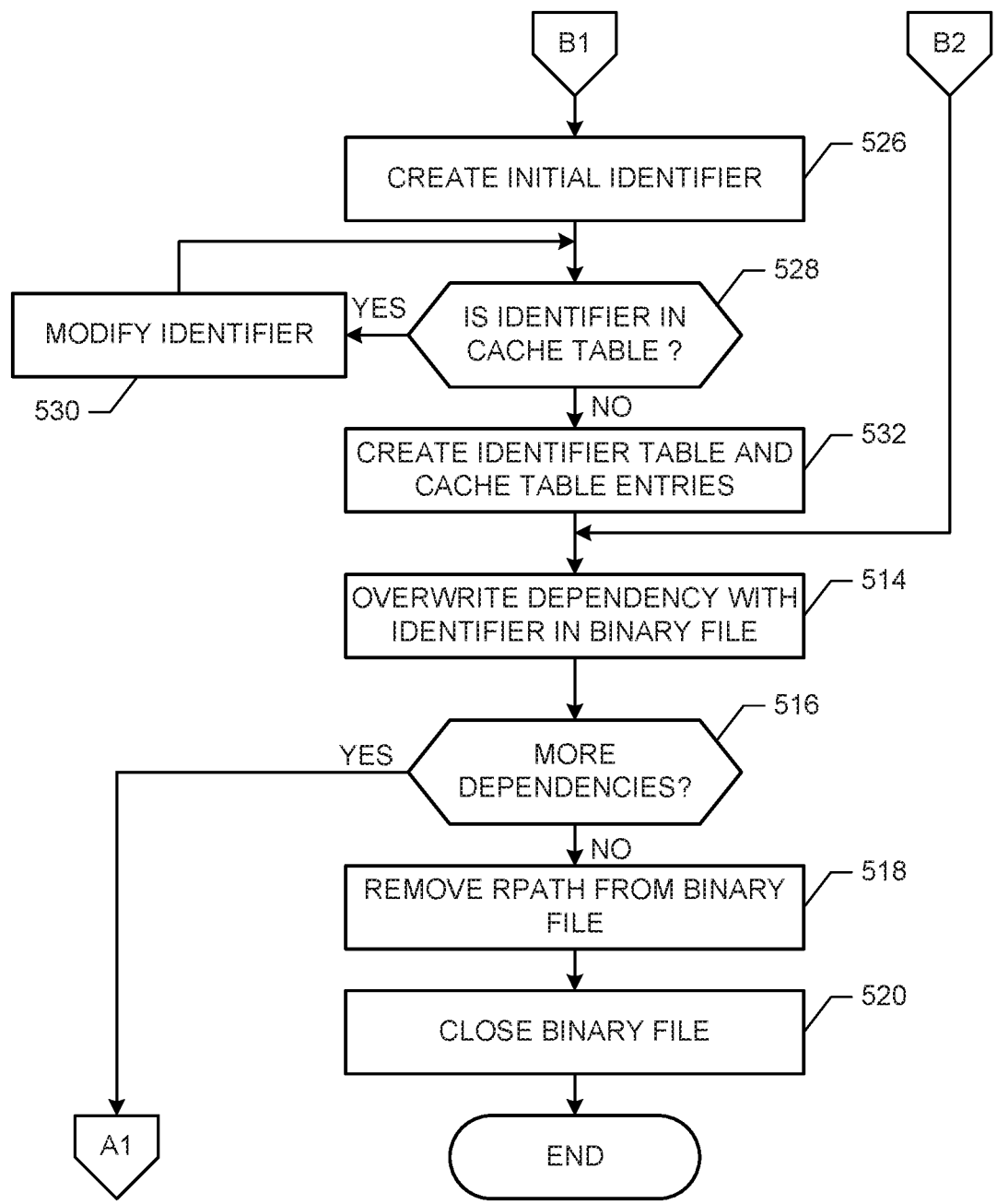

A flowchart representative of example machine readable instructions for implementing the binary modifier 116 of FIG. 1 and/or the binary modifier 400 of FIG. 4 is shown in FIGS. 5A and 5B. In this example, the machine-readable instructions comprise a program for execution by a processor such as the processor 810 shown in the example processor platform 800 discussed below in connection with FIG. 8. The program may be embodied in software stored on a non-transitory computer readable storage medium such as a CD, a floppy disk, a hard drive, a DVD, a Blu-ray disk, or a memory associated with the processor 810, but the entire program and/or parts thereof could alternatively be executed by a device other than the processor 810 and/or embodied in firmware or dedicated hardware. Further, although the example program is described with reference to the flowchart illustrated in FIGS. 5A and 5B, many other methods of implementing the example binary modifier 116 and/or the example binary modifier 400 may alternatively be used. For example, the order of execution of the blocks may be changed, and/or some of the blocks described may be changed, eliminated, or combined. Additionally, or alternatively, any or all the blocks may be implemented by one or more hardware circuits (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware.

As mentioned above, the example processes of FIGS. 5A and 5B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

The example program of FIGS. 5A and 5B includes the example binary file reader 402 (FIG. 4) opening a binary file and accesses the list of filenames in the list of dependencies, and RPATH from the binary file (block 502). The example file locator 404 (FIG. 4) accesses (e.g., gets, obtains, reads, etc.) the file name of the first file (e.g., a name of a library file) (block 504). For example, file locator 404 uses a "get" command to access the file name. The file locator 404 accesses the first path in the RPATH (block 508). For example, the file locator 404 uses a "get" command to access the first path in the RPATH 110 (FIG. 1). Using, the identifiers table manager 408 (FIG. 4), the example file locator 404 (FIG. 4) searches the identifiers table 124 to see if the identifiers table 124 contains an identifier for the combination of the file name of the first file and the first path (block 510). If an identifier is found (block 512), the example binary file writer 412 (FIG. 4) overwrites the file name (e.g., FOO.SO of FIG. 1) in the binary file (e.g., the binary file 102 of FIG. 1) with the identifier (e.g., FOOXYZ of FIG. 1) from the identifiers table 124 (block 514 on FIG. 5B). If all file names have been processed (block 516), the binary file writer 412 removes the RPATH from the binary file (block 518), and closes the binary file (block 520). Control exits from the example program of FIGS. 5A and 5B.

Returning to block 516, if there are more file names to process (block 516), control returns to block 504 in FIG. 5A to get the next file name.

Returning to block 512 in FIG. 5A, if an identifier for the combination of the first file name and first path is not found in the identifiers table 124 (block 512), the file locator 404, using the scalable loader 118, attempts to load the file using the first file name and first path (block 522). If the load is successful (block 524), then the file is cached locally and the example identifier creator 406 creates an initial identifier for the file name and path combination in the local file system (block 526). If the identifiers table manager 408 (FIG. 4) finds the initial identifier in the identifiers table 124 (block 528 in FIG. 5), the identifier creator 406 modifies the identifier (block 530). For example, if the identifier creator 406 creates the identifier FOOXYZ, but finds a matching identifier in the identifiers table 124, the identifier creator 406 modifies the identifier FOOXYZ to a different identifier (e.g., FOOXY1) relative to the other identifier(s) in the identifiers table 124. In some examples, random character substitutions are made.

When the identifier creator 406 (FIG. 4) has generated a unique identifier (block 528), the identifiers table manager 408 (FIG. 4) adds the identifier (e.g., FOOXYZ) and a combination (e.g., /USR/LIB64/LIBFOO.SO) of the file name (e.g., LIBFOO.SO) and path (e.g., /USR/LIB64/) in the global file system to the identifiers table 124 (FIG. 2), and the cache table manager 410 adds the identifier (e.g., FOOXYZ) and a combination (e.g., /TMP/FUSE/USR/LIB64/LIBFOO.SO) of the locally cached file name (e.g., LIBFOO.SO) and path (/TMP/FUSE/USR/LIB64/) to the cache translation table 126 (FIG. 2) (block 532). Control proceeds to block 514 to modify the binary file.

Returning to block 524 in FIG. 5A, if the load is not successful (block 524) and there are more paths in the RPATH (block 534), control returns to block 508 to read the next RPATH entry. If there are no more paths in the RPATH (block 534), then control exits from the example program of FIGS. 5A and 5B with an error. In some examples, the file may be found in system configured paths, such as the LD_LIBRARY_PATH environment variable.

Pseudo-code representative of example machine readable instructions for implementing the binary modifier 116 of FIG. 1 and/or the binary modifier 400 of FIG. 4 is shown in FIG. 6. In this example, the machine-readable instructions comprise a program for execution by a processor such as the processor 810 shown in the example processor platform 800 discussed below in connection with FIG. 8. The program may be embodied in software stored on a non-transitory computer readable storage medium such as a CD, a floppy disk, a hard drive, a DVD, a Blu-ray disk, or a memory associated with the processor 810, but the entire program and/or parts thereof could alternatively be executed by a device other than the processor 810 and/or embodied in firmware or dedicated hardware. Further, although the example program is described with reference to the pseudo-code illustrated in FIG. 6, many other methods of implementing the example binary modifier 116 and/or the example binary modifier 400 may alternatively be used. For example, the order of execution of the blocks may be changed, and/or some of the blocks described may be changed, eliminated, or combined. Additionally, or alternatively, any or all the blocks may be implemented by one or more hardware circuits (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware.

As mentioned above, the example processes of FIG. 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

For each dependency in the list of dependencies (lines 602), and for each path in the RPATH (lines 604), the example file locator 404, starting with a first file name and first path, and using the identifiers table manager 408 (FIG. 4), searches the identifiers table 124 to see if the identifiers table 124 contains an identifier for the combination of the file name of the first file and the first path (line 606). If an identifier is found (line 608), the example binary file writer 412 (FIG. 4) overwrites the file name (e.g., FOO.SO of FIG. 1) in the binary file (e.g., the binary file 102 of FIG. 1) with the identifier (e.g., FOOXYZ of FIG. 1) from the identifiers table 124 (lines 610).

If an identifier for the combination of the first file name and first path is not found in the identifiers table 124 (line 608), the file locator 404, using the scalable loader 118, attempts to load the file using the first file name and first path (line 612). If the load is successful, then the file is cached locally. The example identifier creator 406 creates an initial identifier for the first file name and first path combination in the local file system, and if the identifiers table manager 408 (FIG. 4) finds the initial identifier in the identifiers table 124, the identifier creator 406 modifies the identifier (lines 614). For example, if the identifier creator 406 creates the identifier FOOXYZ, but finds a matching identifier in the identifiers table 124, the identifier creator 406 modifies the identifier FOOXYZ to a different identifier (e.g., FOOXY1) relative to the other identifier(s) in the identifiers table 124. In some examples, random character substitutions are made.

When the identifier creator 406 (FIG. 4) has generated a unique identifier (lines 614), the identifiers table manager 408 (FIG. 4) adds the identifier (e.g., FOOXYZ) and a combination (e.g., /USR/LIB64/LIBFOO.SO) of the file name (e.g., LIBFOO.SO) and path (e.g., /USR/LIB64/) in the global file system to the identifiers table 124 (FIG. 2), and the cache table manager 410 adds the identifier (e.g., FOOXYZ) and a combination (e.g., /TMP/FUSE/USR/LIB64/LIBFOO.SO) of the locally cached file name (e.g., LIBFOO.SO) and path (/TMP/FUSE/USR/LIB64/) to the cache translation table 126 (FIG. 2) (lines 616).

Once all file names have been processed, the binary file writer 412 removes the RPATH from the binary file (line 618). Control exits from the example program of FIG. 6.

FIG. 8 is a block diagram of an example processor platform 800 capable of executing the instructions of FIGS. 5A and 5B to implement the binary modifier 116 of FIG. 1 and the example binary modifier 400 of FIG. 4. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 810. The processor 810 of the illustrated example is hardware. For example, the processor 810 can be implemented by one or more integrated circuits, logic circuits, microprocessors, GPUs, DSPs, computer processors, or controllers from any desired family or manufacturer. The hardware processor may be a semiconductor based (e.g., silicon based) device. In this example, the processor 810 implements the binary file reader 402, file locator 404, the identifier creator 406, the identifiers table manager 408, the cache table manager 410, the binary file writer 412, the dynamic loader 112, and the scalable loader 118.

The processor 810 of the illustrated example includes a local memory 812 (e.g., a cache). The processor 810 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller. In the illustrated example, any of the local memory 812, the volatile memory 814 and/or the non-volatile memory 814 may be used to implement the binary file store 103, the global file system 114, the local file system 120 and the modification records data store 122 of FIG. 1.

The processor platform 800 of the illustrated example also includes an interface circuit 820. The interface circuit 820 may be implemented by any type of interface standard, such as an Ethernet interface, a universal serial bus (USB) interface, a Bluetooth®, a near field communication (NFC) interface, and/or a peripheral component interface (PCI) express interface.

In the illustrated example, one or more input devices 822 are connected to the interface circuit 820. The input device(s) 822 permit(s) a user to enter data and/or commands into the processor 810. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, etc.) a tactile output device, a printer and/or a speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, a coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, CD drives, Blu-ray disk drives, redundant array of independent disks (RAID) systems, and DVD drives.

Coded instructions 832 including the coded instructions of FIGS. 5A and 5B may be stored in the mass storage device 828, in the volatile memory 814, in the non-volatile memory 816, and/or on a removable tangible computer readable storage medium such as a CD or DVD.

From the foregoing, it will be appreciated that example methods, apparatus and articles of manufacture disclosed herein modify binary files for scalable dependency loading on distributed computing systems. From the foregoing, it will be appreciated that methods, apparatus and articles of manufacture disclosed herein enhance the operations of a number of computing system by modifying binary files so they may be scalably loaded on distributed computing systems. In some examples, computer operations can be made more efficient by allowing significantly more compute nodes to be simultaneously loaded and applied to a problem by overcoming the inherent limitations in known methods to load binary files on distributed computing systems. That is, through use of examples disclosed herein, computers can be made to operate more efficiently to simultaneously load and execute binary files on vast numbers of compute nodes of a distributed computing system.

Example methods, apparatus, and articles of manufacture to modify a binary file for scalable dependency loading on distributed computing systems. Further examples and combinations thereof include at least the following.

Example 1 is a method to modify a binary file for scalable dependency loading on a distributed computing system that includes identifying, by executing an instruction with a processor, in the binary file a file name for a shared file, determining, by executing an instruction with the processor, whether the shared file can be loaded based on a path name specified in the binary file, and responsive to a determination that the shared file can be loaded generating, by executing an instruction with the processor, an identifier that can be used to access a local file scalably copied from a global file system to a local file system, and modifying, by executing an instruction with the processor, the binary file by replacing, in the binary file, the file name with the generated identifier.

Example 2 is the method of example 1, wherein determining whether the shared file can be loaded includes caching a copy of the shared file in the local file system.

Example 3 is the method of example 1, wherein the identifier is generated to have no more characters than the file name.

Example 4 is the method of example 1, further including modifying the binary file by removing a run-time search path from the binary file.

Example 5 is the method of example 1, wherein the path name is included in a run-time search path of the binary file.

Example 6 is the method of example 1, further including identifying in the binary file a second file name for a second shared file, determining whether the second shared file can be loaded based on a second path name specified in the binary file, and responsive to a determination that the second shared file can be loaded using the second path name, generating a second identifier that can be used to obtain the second shared file from the local file system, and modifying the binary file by replacing, in the binary file, the second file name with the second identifier.

Example 7 is the method of example 1, further including, responsive to a determination that the shared file cannot be loaded using the path name, using a second path name specified in the binary file to determine whether the shared file can be loaded.

Example 8 is the method of example 1, further including recording in a data store the identifier, and a combination of a second path in the local file system and the file name.

Example 9 is the method of example 8, further including, responsive to a determination that a combination of the path name and the file name is present in the data store, generating the identifier by obtaining a previously generated identifier from the data store for the combination of the path name and the file name.

Example 10 is the method of example 8, further including, responsive to a determination that the identifier is already stored in the data store, modifying the identifier to be unique.

Example 11 is the method of example 1, wherein generating the identifier, and modifying the binary file are performed automatically without user involvement.

Example 12 is the method of example 1, wherein the identifier, when accessed by a dynamic loader, causes the shared file to be loaded from the local file system.

Example 13 is the method of example 1, wherein the binary file includes a binary representation of executable code, and wherein the shared file is accessible to a plurality of compute nodes of the computing system.

Example 14 is an apparatus to modify a binary file for scalable dependency loading on a distributed computing system including a file locator to identify in the binary file a file name for a shared file, a scalable loader to determine whether the shared file can be loaded based on a path name specified in the binary file, an identifier creator to, responsive to a determination that the shared file can be loaded, generate an identifier that can be used to access the shared file from a local file system; and a binary file writer to, responsive to a determination that the shared file can be loaded modify the binary file by replace, in the binary file, the file name with the generated identifier.

Example 15 is the apparatus of example 14, further including a dynamic loader to scalably load the shared file using the identifier.

Example 16 is the apparatus of example 14, wherein the local file system caches a copy of the shared file in the local file system responsive to a determination that the shared file can be loaded.

Example 17 is the apparatus of example 14, wherein the identifier creator generates the identifier to have no more characters than the file name.

Example 18 is the apparatus of example 14, wherein the binary file writer removes a run-time search path from the binary file.

Example 19 is the apparatus of example 14, wherein the path name is included in a run-time search path of the binary file.

Example 20 is non-transitory machine-readable storage medium storing instructions that, responsive to a determination that executed, cause a computer processor to perform at least identifying in a binary file a file name for a dependency file, the dependency file to be scalably loaded on a distributed computing system, determine whether the dependency file can be loaded from a global file system based on a path name specified in the binary file to, and, responsive to a determination that the dependency file can be loaded, generating an identifier that can be used to access the dependency file from a local file system, and replacing, in the binary file, the file name with the generated identifier.

Example 21 is non-transitory machine-readable storage medium of example 20, wherein the instructions, when executed, cause the computer processor to cache a copy of the dependency file in the local file system, generate the identifier to have no more characters than the file name, and remove a run-time search path from the binary file, the run-time search path including the path name.

Example 22 is a method to modify a binary file for scalable dependency loading on a distributed computing system including identifying, by executing an instruction with a processor, in the binary file a file name for a shared file, determining, by executing an instruction with the processor, whether the shared file can be loaded based on a path name specified in the binary file, and, when the shared file can be loaded, generating, by executing an instruction with the processor, an identifier that can be used to access a local file scalably copied from a global file system to a local file system, and modifying, by executing an instruction with the processor, the binary file by replacing, in the binary file, the file name with the generated identifier.

Example 23 is the method of example 22, wherein determining whether the shared file can be loaded includes caching a copy of the shared file in the local file system.

Example 24 is the method of example 22 or 23, wherein the identifier is generated to have no more characters than the file name.

Example 25 is the method of any of examples 22 to 24, further including modifying the binary file by removing a run-time search path from the binary file.

Example 26 is the method of any of examples 22 to 25, wherein the path name is included in a run-time search path of the binary file.

Example 27 is the method of any of examples 22 to 26, further including identifying in the binary file a second file name for a second shared file, determining whether the second shared file can be loaded based on a second path name specified in the binary file and, responsive to a determination that the second shared file can be loaded using the second path name, generating a second identifier that can be used to obtain the second shared file from the local file system, and modifying the binary file by replacing, in the binary file, the second file name with the second identifier.

Example 28 is the method of any of examples 22 to 27, further including, responsive to a determination that the shared file cannot be loaded using the path name, using a second path name specified in the binary file to determine whether the shared file can be loaded.

Example 29 is the method of any of examples 22 to 28, further including recording in a data store the identifier, and a combination of a second path in the local file system and the file name.

Example 30 is the method of example 29, further including, responsive to a determination that a combination of the path name and the file name is present in the data store, generating the identifier by obtaining a previously generated identifier from the data store for the combination of the path name and the file name.

Example 31 is the method of example 29, further including, responsive to a determination that the identifier is already stored in the data store, modifying the identifier to be unique.

Example 32 is a non-transitory computer-readable storage medium comprising instructions that, when executed, cause a computer processor to perform any of the examples 22 to 31.

Example 33 is an apparatus to modify a binary file for scalable dependency loading on a distributed computing system including a file locator to identify in the binary file a file name for a shared file, a scalable loader to determine whether the shared file can be loaded based on a path name specified in the binary file, an identifier creator to, responsive to a determination that the shared file can be loaded, generate an identifier that can be used to access the shared file from a local file system, and a binary file writer to, responsive to a determination that the shared file can be loaded, modify the binary file by replace, in the binary file, the file name with the generated identifier.

Example 34 is the apparatus of example 33, further including a dynamic loader to scalably load the shared file using the identifier.

Example 35 is the apparatus of example 33 or 34, wherein the local file system caches a copy of the shared file in the local file system responsive to a determination that the shared file can be loaded.

Example 36 is the apparatus of any of examples 33 to 35, wherein the identifier creator generates the identifier to have no more characters than the file name.

Example 37 is the apparatus of any of examples 33 to 36, wherein the binary file writer removes a run-time search path from the binary file, and wherein the path name is included in a run-time search path of the binary file.

Example 38 is a system including means for identifying in a binary file a file name for a shared file, means for determining whether the shared file can be loaded based on a path name specified in the binary file, means for, responsive to a determination that the shared file can be loaded, generating an identifier that can be used to access the shared file from a local file system, and means for, responsive to a determination that the shared file can be loaded, modifying the binary file by replacing, in the binary file, the file name with the generated identifier.

Example 39 is the apparatus of example 38, further including a means for scalably loading the shared file using the identifier.

Example 40 is the apparatus of example 38 or 39, wherein the means for determining caches a copy of the shared file in the local file system responsive to a determination that the shared file can be loaded.

Example 41 is the apparatus of any of examples 38 to 40, wherein the means for generating generates the identifier to have no more characters than the file name.

Example 42 is the apparatus of any of examples 38 to 41, wherein the means for modifying removes a run-time search path from the binary file, and wherein the path name is included in a run-time search path of the binary file.

"Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Conjunctions such as "and," "or," and "and/or" are inclusive unless the context clearly dictates otherwise. For example, "A and/or B" includes A alone, B alone, and A with B. In this specification and the appended claims, the singular forms "a," "an" and "the" do not exclude the plural reference unless the context clearly dictates otherwise.

Any references, including publications, patent applications, and patents, cited herein are hereby incorporated by reference to the same extent as if each reference were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to share a binary file among compute nodes in a distributed computing system, the method comprising:
    identifying in the binary file, by executing an instruction with a processor, a first file name and a second file name, the first file name and the second file name corresponding to a first file stored in a first file system;
    determining, by executing an instruction with the processor, whether the first file can be loaded by a first compute node of the compute nodes based on a first path name specified in the binary file;
    responsive to a determination that the first file can be loaded by the first compute node:
        copying, by executing an instruction with the processor, the first file to a second path name in a second file system to generate a first copy file;
        generating, by executing an instruction with the processor, a first identifier that can be used by the first compute node to access the first copy file from the second file system at the second path name; and
        replacing, by executing an instruction with the processor, the first file name with the first identifier in the binary file;
    determining, by executing an instruction with the processor, whether the first file can be loaded by a second compute node of the compute nodes based on a third path name specified in the binary file; and
    responsive to a determination that the first file can be loaded by the second compute node:
        generating, by executing an instruction with the processor, a second copy file corresponding to the first file at a fourth path name in the second file system;

generating, by executing an instruction with the processor, a second identifier that can be used by the second compute node to access the second copy file from the second file system at the fourth path name; and replacing, by executing an instruction with the processor, the second file name with the second identifier in the binary file.

2. The method of claim 1, wherein the first identifier is generated to have no more characters than the first file name and the second identifier is generated to have no more characters than the second file name.

3. The method of claim 1, further including modifying the binary file by removing a run-time search path from the binary file.

4. The method of claim 1, wherein at least one of the first path name or the third path name is included in a run-time search path of the binary file.

5. The method of claim 1, further including, responsive to a determination that the first file cannot be loaded using the first path name, using a fifth path name specified in the binary file to determine whether the first file can be loaded, the first path name different from the third path name.

6. The method of claim 1, further including recording, in a data store, at least one of: (i) the first identifier, and a first combination of the second path name in the second file system and the first file name, or (ii) the second identifier, and a second combination of the fourth path name in the second file system and the second file name.

7. The method of claim 6, further including, responsive to the first combination of the second path name and the first file name being present in the data store, generating the first identifier by obtaining a previously generated identifier from the data store.

8. The method of claim 6, further including, responsive to the first identifier being already stored in the data store, modifying the first identifier to be an identifier not already stored in the data store.

9. The method of claim 1, wherein the generating of the first identifier and the second identifier, and the replacing of the first file name of the binary file are performed automatically without user involvement.

10. The method of claim 1, wherein the first identifier, when accessed by a dynamic loader, causes the first file to be loaded from the second file system.

11. The method of claim 1, wherein the binary file includes a binary representation of executable code, and wherein the first file is accessible to the compute nodes.

12. An apparatus to share a binary file among compute nodes in a distributed computing system, the apparatus comprising:
  a file locator to identify in the binary file a first file name and a second file name, the first file name and the second file name corresponding to a first file stored in a first file system;
  a scalable loader to:
    determine whether the first file can be loaded by a first compute node of the compute nodes based on a first path name specified in the binary file; and
    determine whether the first file can be loaded by a second compute node of the compute nodes based on a second path name specified in the binary file;
  an identifier creator to:
    responsive to a determination that the first file can be loaded by the first compute node, generate a first identifier that can be used by the first compute node to access a first copy file from a second file system at a third path name in response to the first copy file being generated by copying the first file to the second file system at the third path name; and
    responsive to a determination that the first file can be loaded by the second compute node, generate a second identifier that can be used by the second compute node to access a second copy file from the second file system at a fourth path name in response to the second copy file being generated by copying the first file to the second file system at the fourth path name; and
  a binary file writer to:
    replace the first file name with the first identifier in the binary file; and
    replace the second file name with the second identifier in the binary file.

13. The apparatus of claim 12, further including a dynamic loader to load the first file using the first identifier.

14. The apparatus of claim 12, wherein the second file system is to cache the first copy file and the second copy file in the second file system.

15. The apparatus of claim 12, wherein the identifier creator is to at least one of: (i) generate the first identifier to have no more characters than the first file name or (ii) generate the second identifier to have no more characters than the second file name.

16. The apparatus of claim 12, wherein the binary file writer is to remove a run-time search path from the binary file.

17. The apparatus of claim 12, wherein the first path name and the second path name are included in a run-time search path of the binary file.

18. A non-transitory machine-readable storage medium comprising instructions that, when executed, cause a processor to at least:
  identify in a binary file a first file name and a second file name, the binary file to be shared among compute nodes in a distributed computing system, the first file name and the second file name corresponding to a first file stored in a first file system;
  determine whether the first file can be loaded by a first compute node of the compute nodes based on a first path name specified in the binary file to;
  responsive to a determination that the first file can be loaded by the first compute node:
    copy the first file to a second path name in a second file system to generate a first copy file;
    generate a first identifier that can be used by the first compute node to access the first copy file from the second file system; and
    replace the first file name with the first identifier in the binary file;
  determine whether the first file can be loaded by a second compute node of the compute nodes based on a third path name specified in the binary file; and
  responsive to a determination that the first file can be loaded by the second compute node:
    generate a second copy file corresponding to the first file at a fourth path name in the second file system;
    generate a second identifier that can be used by the second compute node to access the second copy file from the second file system at the fourth path name; and
    replace the second file name with the second identifier in the binary file.

19. The non-transitory machine-readable storage medium of claim 18, wherein the instructions, when executed, cause the processor to:
   generate the first identifier to have no more characters than the first file name;
   generate the second identifier to have no more characters than the second file name; and
   remove a run-time search path from the binary file, the run-time search path including the first path name and the third path name.

20. The method of claim 1, further including, generating a modified binary file based on the replacement of the first file name and the second file name, and, in response to the first compute node accessing the modified binary file, loading the first copy file from the second file system at the second path name.

21. The non-transitory machine-readable storage medium of claim 18, wherein the instructions, when executed, cause the processor to generate a modified binary file based on the replacement of the first file name and the second file name, the modified binary file to cause the first compute node to load the first copy file from the second file system at the second path name when the first compute node accesses the modified binary file.

* * * * *